United States Patent [19]

Olson

[11] Patent Number: 5,305,958
[45] Date of Patent: Apr. 26, 1994

[54] DUAL-DIRECTIONALLY HYDRAULICALLY-CONTROLLABLE CENTER-PIVOT IRRIGATION APPARATUS

[76] Inventor: Theodore V. Olson, 105 W. Neely St., Atkinson, Nebr. 68713

[21] Appl. No.: 839,473

[22] Filed: Feb. 19, 1992

[51] Int. Cl.$^5$ .............................................. B05B 3/18
[52] U.S. Cl. .................................... 239/733; 239/728
[58] Field of Search ............... 239/728, 729, 730, 731, 239/733, 738

[56] References Cited

U.S. PATENT DOCUMENTS

| | | | |
|---|---|---|---|
| 3,386,661 | 6/1968 | Olson et al. | 239/731 |
| 3,587,763 | 6/1971 | Kinkead | 239/733 |
| 3,598,142 | 8/1971 | Neier | 239/731 |
| 3,599,664 | 8/1971 | Hotchkiss | 239/731 |
| 3,690,343 | 9/1972 | Crane | 239/731 |
| 3,766,937 | 10/1973 | Lundvall et al. | 239/731 |
| 4,135,539 | 1/1979 | Hunter et al. | 239/731 |
| 4,142,547 | 3/1979 | Courtright | 239/733 |
| 4,153,070 | 5/1979 | Marcotte | 239/738 |

Primary Examiner—Andres Kashnikow
Assistant Examiner—Christopher G. Trainor
Attorney, Agent, or Firm—George R. Nimmer

[57] ABSTRACT

In the prior art, there is U.S. Pat. No. 3,386,611 which discloses a uni-directionally controlled hydraulically-actuatable center-pivot irrigation apparatus, having strategically located three-way valves. The instant invention discloses a dual-directionally controlled hydraulically-actuatable center-pivot irrigation apparatus having strategically located four-way valves, a dual-directional-valve, and other ancillary features interposed along hydraulic-control lines for the center-pivot irrigation apparatus. Accordingly, there are ancillary means for controlling the angular directional movement of the irrigation apparatus through a dual-directional-valve conveniently located at the center of a field to be irrigated by the apparatus.

2 Claims, 5 Drawing Sheets

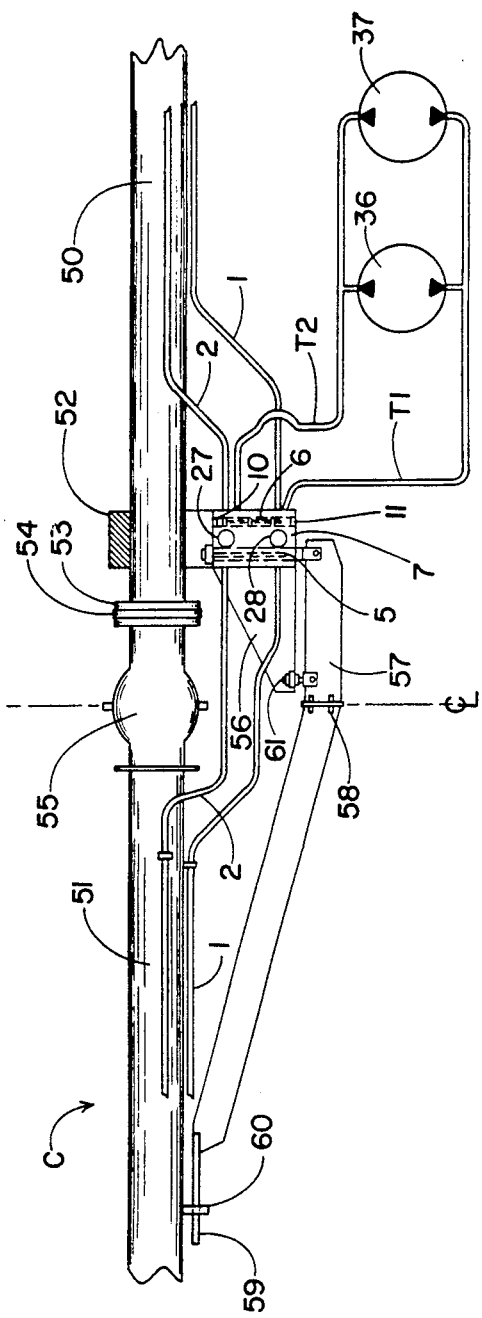
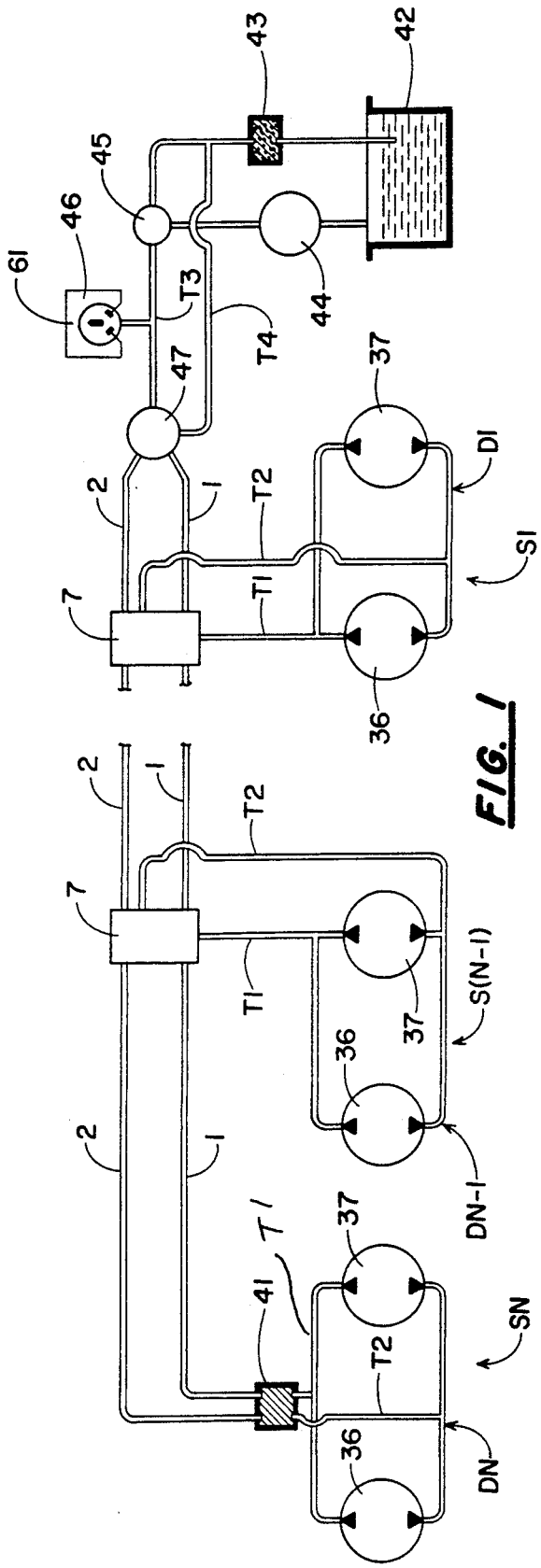
FIG. 2
FIG. 1

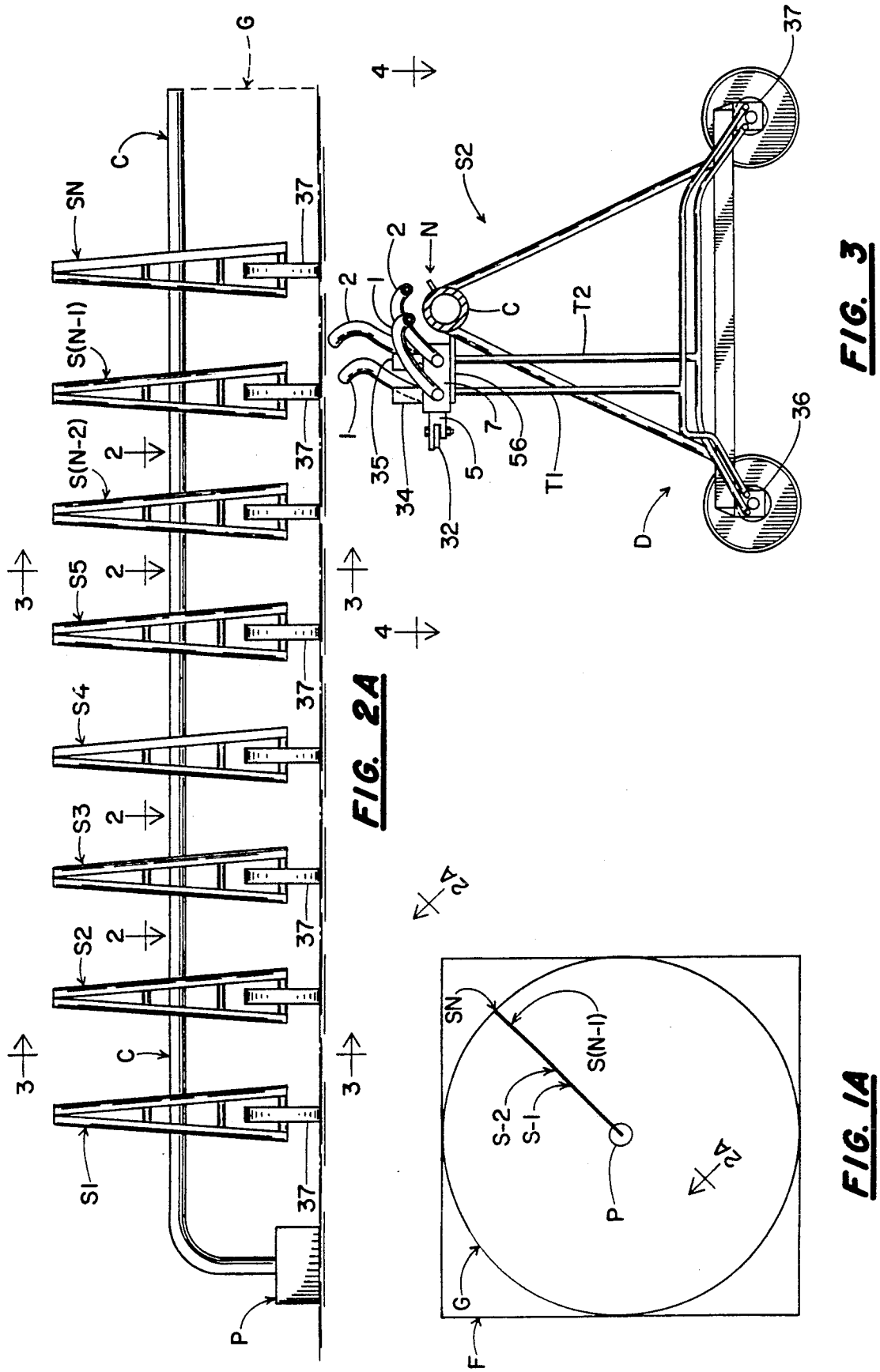

5,305,958

DUAL-DIRECTIONALLY HYDRAULICALLY-CONTROLLABLE CENTER-PIVOT IRRIGATION APPARATUS

BACKGROUND OF THE INVENTION

U.S. Pat. No. 3,386,611 discloses a uni-directionally angularly controlled hydraulically-actuatable and linearly-alignable center-pivot irrigation apparatus wherein the lineal-alignability in a single angular direction is provided by strategically located three-way valves. However, the said cited and related prior art does not provide linearly-alignable capability for a dual-directional linearly-aligned capability for hydraulically motivated center-pivot irrigation apparatus.

OBJECT OF THE INVENTION

It is accordingly the general objective of the present invention to provide the capability, for a center-pivot hydraulically motivated center-pivot apparatus, provision for apparatus lineal-alignability that is selectably initiable at the inward-end portion of the center-pivot apparatus, and effective for both angular directional movements of the center-pivot irrigation apparatus.

GENERAL STATEMENT OF THE INVENTION

With the above general objective in view, and together with other ancillary and related objectives which will become more apparent as this description proceeds, the dual-directionally hydraulically-controllable center-pivot irrigation apparatus of the present invention generally comprises the strategic interposition of four-way valves along the hydraulic motivation means, a dual-directional-valve, and other ancillary features, which will hereinafter be more particularly described.

BRIEF DESCRIPTION OF THE DRAWING

In the drawing, wherein like characters refer to like parts in the several views, and in which:

FIG. 1A is a top plan schematic diagram of a rectangular field (F) to be sprinkled or irrigated in a circular area portion (G) according to a centrally pivotably-affixed (P) irrigation apparatus of the present invention;

FIG. 2A is a frontal elevational view, as seen along line 2A of FIG. 1A, of the irrigation apparatus comprising a pivotably-affixed (P) conduit-type (C) irrigation apparatus and having several upright supports (S) along the elongate conduit portion (C) of said irrigation apparatus;

FIG. 1 is a schematic view of the dual directionally and hydraulically-controllable center-pivot irrigation apparatus of the present invention, and directed to the closed-circuit hydraulic network therealong;

FIG. 2 is a sectional plan view taken along lines 2—2 of FIG. 2A;

FIG. 3 is a sectional elevational view taken along lines 3—3 of FIG. 2A;

DETAILED DESCRIPTION OF THE DRAWING

Figure 4:
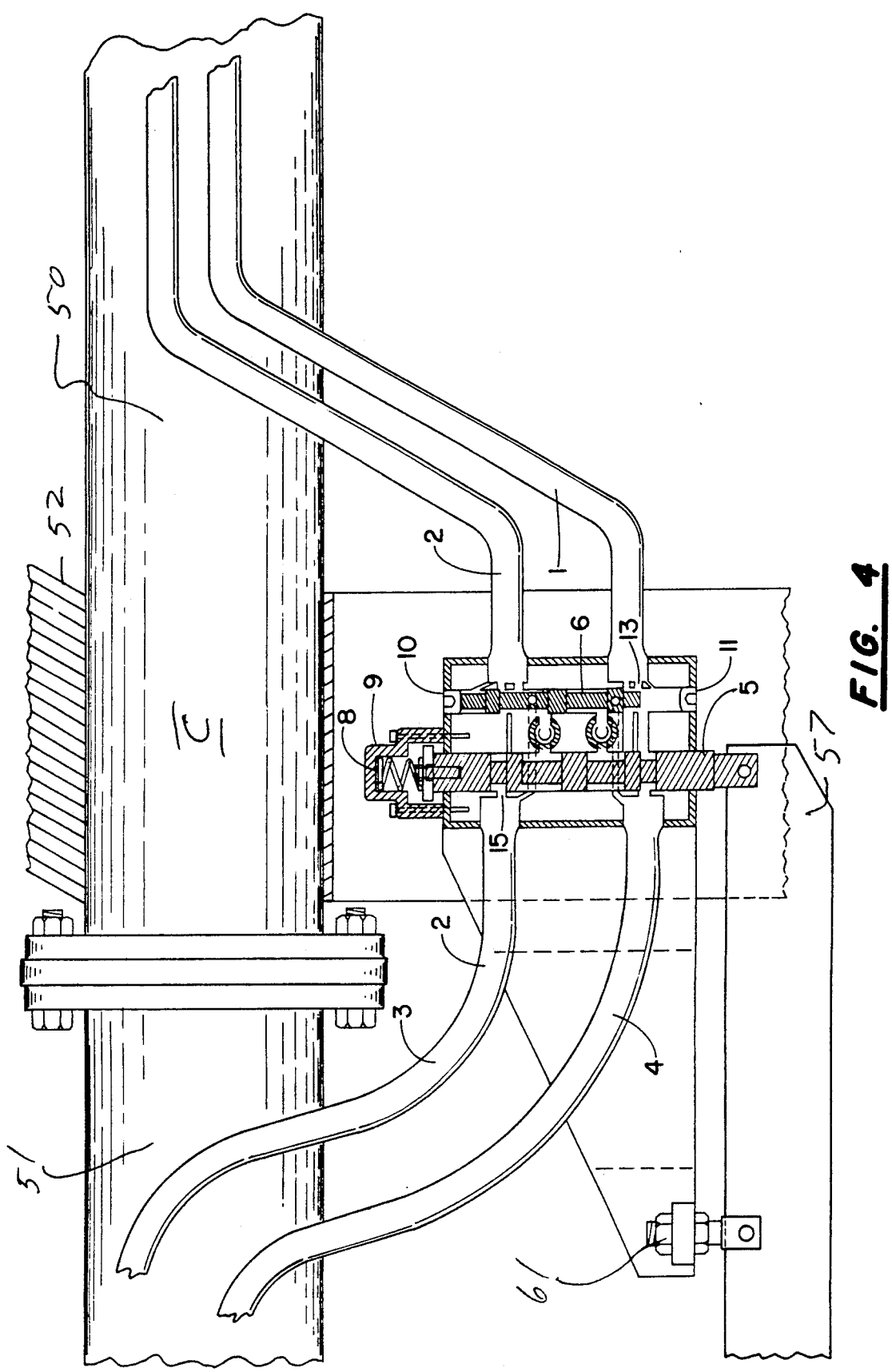
FIG. 4 is a detail view taken from FIG. 2 and from lines 4—4 of FIG. 3.
Figure 5:
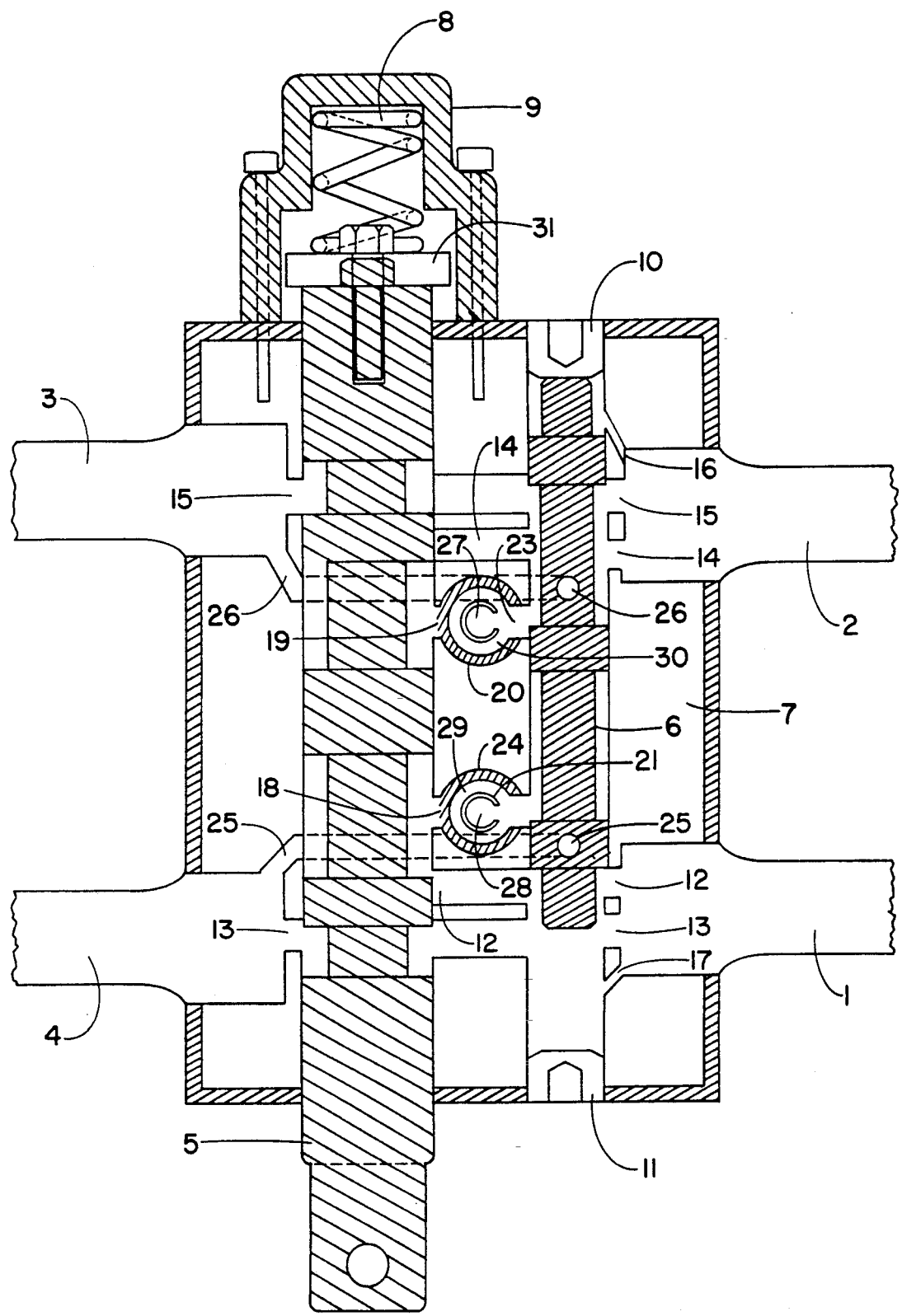
FIG. 5 is an enlarged detail view of FIG. 4.

As alluded to in drawing FIGS. 1A and 2A, self-propelled center-pivot irrigation apparatuses are normally comprised of a relatively lengthy water distributing conduit C having water-spraying nozzles N therealong and having a length of about one-half the length of a rectangular field F to be irrigated. In the typical case of a 160-acres rectangular field F, the length of conduit C is about 1320 feet. Elongate conduit C is connected at the center of a rectangular field F to a central water-supply pipe P. When rotated about fixed-pivot pipe P, the outer end of water distributing conduit C will circumscribe an irrigated central area G for irrigation (N) therewithin.

There is a plurality of upright supports S spaced at substantially regular intervals along horizontal conduit C. The several supports S are numbered sequentially starting at innermost support S1 (at fixed-pivot P) until the outermost support SN is reached. There are drive means D at each support S to cause the nozzled conduit C to move laterally about fixed-pivot water-pipe P. For example, each drive means D acts upon ground-transversing wheels 36 and 37. The drive means D can be numbered sequentially as D1–DN at upright supports S1–SN, respectively.

It is a universally recognized requirement of the self-propelled center-pivot irrigation industry that the several upright supports S must be maintained substantially linearly aligned along said lengthy water distributing conduit C, so as to prevent buckling, jackknifing, or even breaking of elongate conduit C. As alluded to in schematic view 1 and in ancillary drawing Figures: The present invention is primarily concerned with such alignment means, and too for centrally-controlling (e.g. 47 at innermost support S1) selective clockwise and counter-clockwise movement of elongate conduit C about its fixed-pivot P.

Turning initially to schematic drawing FIG. 1, the aforementioned supports-alignment and central-control means generally comprises:

(a) pump means (44) for pressurably introducing oleaginous hydraulic fluid from a reservoir (42) into a dual-directional-valve (47) located between the conduit C fixed-pivot-inward-end P and said innermost support S1;

(b) a tubular first-main (1) extending from dual-directional-valve 47 and along the length of said lengthy conduit C to the said outermost support (SN) therefor;

(c) a tubular second-main (2) extending from dual-directional-valve 47 and along the length of lengthy conduit C to the said outermost support S N therefor, and which second-main is interconnected at SN with said first-main (1), and through a novel filter mechanism (41), to the drive means (D N) for the ground-traversible wheels 36 and 37 thereat;

(d) at each said conduit support means (S . . . S(N −1), but not at outermost support SN, a four-way fluid valve (7) is interconnected between: said first-main (1); said second-main (2); and also bi-directionally (T1, T2) to the drive means (D) for each said involved support member (S1–S(N−1)); and (e) means responsive to laterally flexing along elongate conduit (C) at each upright support (S) therealong (but not at outermost support SN) due to any temporary misalignment at a said support (S) and acting through a four-way valve (7) thereat; and whereby the two alternate settings of said dual-directional-valve (47) and the so-positioned four-way valves (7) will maintain the said lengthy conduit (C) in lineal alignment as it is made to angularly rotate, clockwise or counterclockwise as commanded by valve 47, about said conduit fixed-pivot inward-end (P).

Figure 6:
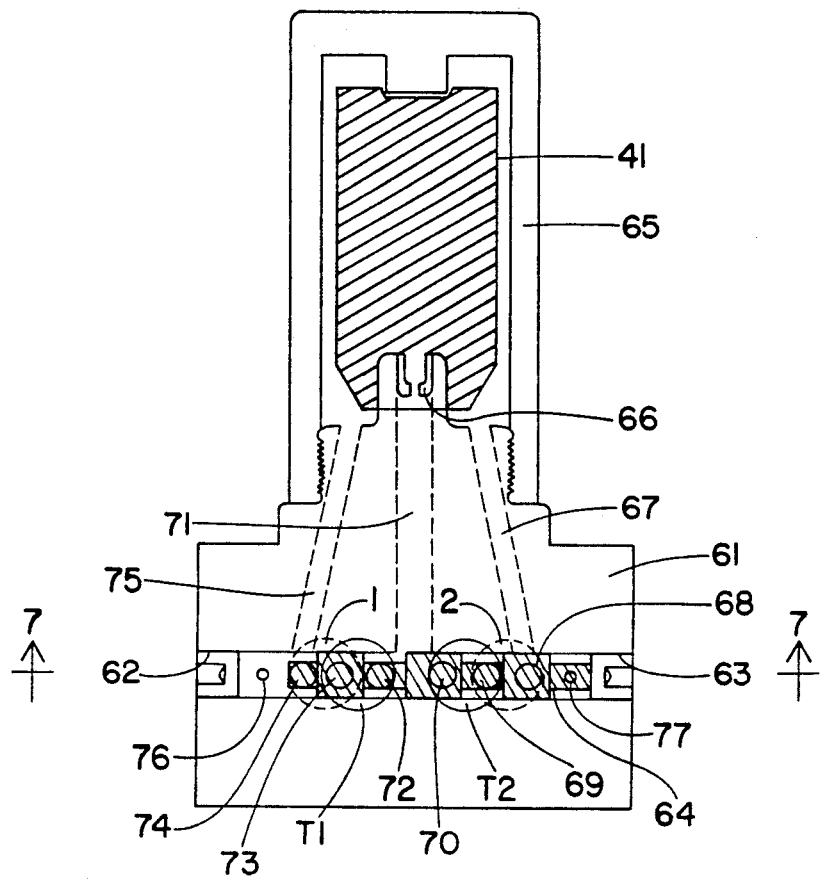
FIG. 6 is a detail view of the filter element (41) depicted in FIG. 1.

In view of the foregoing, one skilled in the center-pivot irrigation apparatus art will inherently compare: schematic drawing FIG. 1 of this application with drawing FIGS. 4 and 6 of U.S. Pat. No. 3,386,661; and also the immediately preceeding test (a-e) with columns 4 and 5 of U.S. Pat. No. 3,386,661. This compelled comparison by workers in this art reveals that irrigation apparatus of the present invention differs from center-pivot irrigation apparatus disclosed in U.S. Pat. No. 3,386,661, primarily, as follows:

(i) the addition of a dual-directional-valve (47) herein, and at a position between elements (S1) and (90) of drawing FIG. 4 of U.S. Pat. No. 3,386,661;

(ii) substitution of the four-ways valves (7) shown herein at drawing FIGS. 2-5 for the three-ways valves (20) of drawing FIGS. 4 and 6 of U.S. Pat. No. 3,386,661; and (iii) the result of (i) and (ii) immediately hereabove being that the center-pivot irrigation apparatus herein as directionally commandable to move in both angular directions about the fixed-pivots P (shown herein at FIGS. A and AA, and at FIGS. 1 and 2 of U.S. Pat. No. 3,386,661), but whereas the irrigation apparatus of U.S. Pat. No. 3,386,661 is shown as movable in but one angular direction about apparatus fixed-pivot P.

From the foregoing, the construction and operation of the dual-directionally hydraulically-controllable center-pivot irrigation apparatus of the present invention will be readily understood to those well skilled in the center-pivot irrigation art (and especially those familiar with U.S. Pat. No. 3,386,661), and further explanation is believed to be unnecessary. However, for those persons who are only marginally skilled in the hydraulically-controllable center-pivot irrigation art, the following text is furnished.

In one of the two alternative situations wherein first-main 1 (instead of second main 2) is pressurized (according to one of the two permissible settings for dual-directional-valve 47) first-main 1 proceeds to a four-way valve 7 at upright supports S1-S(N−1), and thence to drive means DN for outermost support tower SN. As support tower SN is thereby caused to move laterally, any lineal misalignment of conduit C will cause the following affects at next-outer-support S(N−1), namely at four-way valve 7 thereat: Control arm 57 activates spool 5 (a multi-grooved cylindrical plunger) to open-up an orifice which will pressurize line T1 on support tower S (N−1) causing same to move forward and stay linearly with preceeding named towers. As support tower S(N−1) moves laterally, it will continually activate the next inward support tower, and activate the valve (7) thereon which will likewise pressure line T1 to cause wheel drive motors 36 and 37 to move said support SN and keep it aligned with remaining towers. Returning oil flows through lines T2 to second-main 2 through each said four-way valves 7 back through a four-way solenoid controlled valve 47.

52 indicates a portion of the support tower attaching bracket. 53 indicates the flange on conduit C, and 54 indicates the gasket therefor. 55 indicates a flex joint which allows for pipe (conduit) misalignment. 56 indicates a mount that attaches four-way valves 7 to two intermediate support towers. 57 indicates a control arm, and 58 indicates a hinge on control arm 57 allowing for rough terrain conditions. 60 indicates an attaching bracket that controls arm 57. 59 indicates a pin that is welded to control arm 57. This allows for linear movement in these locations as the pipe misaligns. 61 indicates an adjustable linkage for keeping all support towers in alignment.

Moreover, each said valve 7 has a master spool 5 and a slave spool. Master-line 1, when pressurized, forces spool 6 toward plug 10. This allows hydraulic fluid to flow through valve 7 toward orifice 13. In the drawing, spool 5 is pulled out a slight distance which allows hydraulic fluid pressure to flow from orifice 12 into the chamber of spool 5. Then, from valve outer chamber 18, it flows through a special adapter to the outer case on filter 35 through a filter element into valve chamber 28. From chamber 28, it flows into line T1 to drive means motors 36 and 37 and out of exhaust ports in the wheel motors 36-37 into line T2 and back into control valve chamber 27, through port 23, into the chamber of spool 6 and back into the tank via main-line 2. The main flow of oil through valves 7 via orifices 13 flows to similar valves 7. Oil flow through the outermost tower SN is directed through lines 1 and T1 to drive means motors 36 and 37, and back through line T2, into main-line 2 and back thru main-line 2 through all intermediately positioned valves 7 to the oil reservoir tank.

When the orifice 23 is "open", this allows oil to flow thru orifices 15 and also thru orifices 26 into the chamber of spools 6 and back to main-line 2 and back to the oil reservoir tank. In the event that an intermediate support tower stalls and the irrigation apparatus is running in an axial direction, spool 5 will pull out in direction away from retaining cap 9 and will close-off port 13. Once port 13 is closed off, the full flow of oil will be diverted to port 12 and thru port 18 through the filter to T1 on an intermediate support tower. With all the oil being diverted thru port 12, there is a small orifice inserted in the base of filter 34 and of #35. This will allow the total flow of oil being generated by pump 44 to pass thru it without a pressure build-up. In this case, it will cause the pressure to rise in said gauge 46. If port 25 was not closed when main-line 1 is pressurized, closing-off of pressurized-line 1, closed port 13 would not cause a pressure buildup because the flow would be diverted thru ports 25 and thru valves 7 and onto the next b valves 7 at succeeding support towers S. Ports 25 and 26 are very important at valves 7. If port 13 is closed-off and the operator wishes to reverse the system in the opposite axial direction, main-line 2 will be pressurized. When line-1 is pressurized, it will immediately force spool 6 toward retaining cap 11 which will in turn open port 25 but close port 26, and port 15 will remain open. This will allow oil to flow thru port 15 onto the next intermediate support tower and back thru line 1 to the oil reservoir tank. However, when the hydraulic fluid impinges an intermediate tower with port 13 "closed", there would be no place for oil to go if it could not flow through port 25 back to tank. Once the intermediate tower that was stalled has re-aligned itself, then oil can normally flow through port 13. The irrigation apparatus would not be able to run in reverse to align itself, however, if oil was not allowed to temporarily bypass through valve 7 through port 25. Some other components of valve 7 are a stroke-limiting cap 9, a spring 8, and limiting washer 31. Limiting washer 31 allows spool 5 to travel in a fixed movement, both in and out.

The orifice configuration on valve 7 for main-line 2 is a mirror-image of main-line 2. This allows for not only alignment in both angular directions of fixed-pivot P, but it also allows for a manually-initiated mechanical shutdown in both angular directions.

Figure 7:
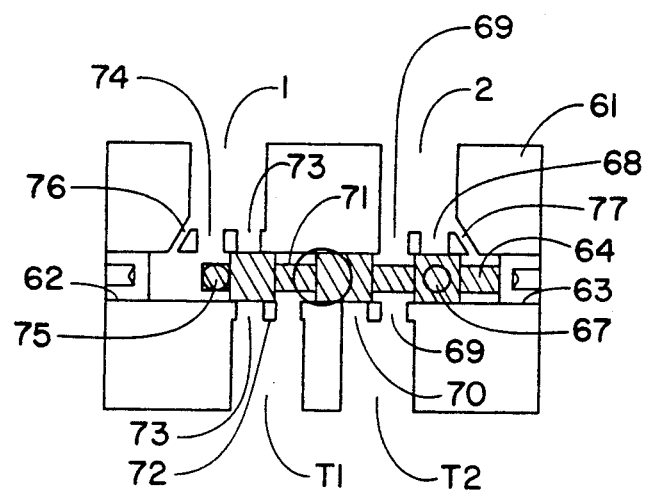
FIG. 7 is a sectional view taken along line 7—7 of FIG. 6.

Tangentially referred to in U.S. Pat. No. 3,386,661 is a filter mechanism 41 interposed at the hydraulic lines there 11 and 12 toward final drive means DN. FIGS. 6 and 7 herein refer to a readily-adaptable filter mechanism 41 which is admirably adaptable for the present invention: Relative to FIGS. 6 and 7, main-line 1 at filter mechanism 41 pressurizes port 76 which forces spool 64 toward retaining plug 63. This allows hydraulic pressure to flow thru port 74 into port 74 into the chamber of spool 64. Spool 64 is a cylindrical spool with multi-grooved lands machined into it. Hydraulic pressure then flows thru port 75 into filter mechanism housing 65. The hydraulic fluid then passes through filter mechanism 41 thru orifice 66 into port 71. From port 71, it flows into the chamber of spool 64 thru port 72 to line T1. From T1 it flows to wheel drive motors 36 and 37. Return oil from wheel drive motors 36 and 37 flows thru main-line 2 into port 69 into chamber of spool 64 into port 69 thence to main-line 2 all-the-way-back to pivot valve 47 and thence returns thru filter 43 to the tank.

In the event that a mal-function happens in the outermost support tower SN, all the inwardly positioned intermediate towers will pull-up-in-line and will close all orifices directed to end tower SN.

In view of the foregoing, it is not desired to limit the invention to the exact construction shown and described, except as not included within the appended claims of this patent application.

I claim:

1. In a sprinkling and irrigating apparatus for a section of land which includes a centrally located water supply pipe, a horizontally extending water distributing conduit having a fixed-pivot inward-end pivotably connected at said supply pipe and having a conduit outward-end, said conduit being axially movable around said supply pipe, a plurality of upright and ground-engaging supports disposed at spaced positions along and horizontally elevating said conduit and including an innermost support located nearest said conduit fixed-pivot inward-end, an outermost support located nearest said conduit outward-end, and a next-outermost support directly inwardly neighboring said outermost support, said horizontally disposed water distributing conduit being adapted to laterally flex due to temporary misalignment of said support members, drive means at each upright support for laterally moving the supports and the associated horizontal water distributing conduit around the central water supply pipe, and alignment means tending to maintain the several supports in lineal alignment, the improvement wherein said water distributing conduit is selectably commandably moveable clockwise or counterclockwise according to a commandable dual-directional-valve and wherein said alignment means comprises:

(a) pump means for introducing non-acqueous hydraulic fluid into a said dual-directional-valve located between the conduit inward-end and said innermost support;
    (b) a first-main extending along said conduit, from said dual-directional valve to the drive means for said outermost upright support;
    (c) a second-main extending along said conduit;
    (d) at each of said upright supports, but to the exclusion of said outermost support, a four-ways fluid valve interconnected between: said first main; said second main; and also bi-directionally to the drive means for said support member; and
    (e) means responsive to lateral flexing along the said water distributing conduit at each of said upright supports but not at said outermost support, and acting through a said four-way fluid valve to control hydraulic fluid flow into the drive means;

whereby alternate settings of said strategically centrally located dual-directional valve will maintain the water distributing conduit in lineal alignment as said conduit is commanded to alternatively axially rotate clockwise or counterclockwise about said conduit fixed-pivot inward-end.

2. The improved sprinkling and irrigation apparatus of claim 1 wherein the first-main and the second-main extend into a filter mechanism before communicating with the outermost support drive means.

* * * * *